United States Patent [19]
Okada et al.

[11] Patent Number: 6,140,913
[45] Date of Patent: Oct. 31, 2000

[54] APPARATUS AND METHOD OF ASSISTING VISUALLY IMPAIRED PERSONS TO GENERATE GRAPHICAL DATA IN A COMPUTER

[75] Inventors: Yoshihiko Okada; Katsuhiro Yamanaka, both of Tokyo, Japan

[73] Assignee: NEC Corporation, Tokyo, Japan

[21] Appl. No.: 09/118,972

[22] Filed: Jul. 20, 1998

[51] Int. Cl.[7] .................................................. H04B 3/36
[52] U.S. Cl. .................................. 340/407.2; 340/407.1; 340/825.19; 434/112; 434/113
[58] Field of Search ........................... 340/407.1, 407.2, 340/825.19; 434/112, 113, 114, 115

[56] References Cited

U.S. PATENT DOCUMENTS

| | | | |
|---|---|---|---|
| 4,687,444 | 8/1987 | Garner | 434/114 |
| 4,694,494 | 9/1987 | Woolfson | 381/51 |
| 5,412,189 | 5/1995 | Cragun | 235/379 |
| 5,556,283 | 9/1996 | Stendardo et al. | 434/188 |
| 5,588,839 | 12/1996 | Shimoda | 434/114 |
| 5,589,855 | 12/1996 | Blumstein et al. | 345/173 |
| 5,607,309 | 3/1997 | Finn | 434/107 |
| 5,725,379 | 3/1998 | Perry | 434/113 |

FOREIGN PATENT DOCUMENTS

| | | |
|---|---|---|
| 0 542 054 | 5/1993 | European Pat. Off. . |
| 2 315 859 | 2/1989 | United Kingdom . |
| 2 315 357 | 1/1998 | United Kingdom . |
| WO 96/08804 | 3/1996 | WIPO . |

OTHER PUBLICATIONS

Ohnishi, N., et al., "A Support System for the Blind to Recognize a Diagram," IEEE Engineering in Medicine & Biology Society 11th Annual International Conference, pp. 1510–1511 (1989).

*Primary Examiner*—Daryl Pope
*Attorney, Agent, or Firm*—Foley & Lardner

[57] ABSTRACT

In order to assist a visually impaired person to generate digital image data in a computer, a plurality of graph components are provided each of which is tactually recognized by the visually impaired person. A touch graph is generated using the graph components on a plate-like member by the visually impaired person. The touch graph is acquired into a computer using an input interface such as a digital still camera. Subsequently, a computer software analyzes the digital image data so as to define each of the graph components and logical relationship between the graph components. The analyzed digital image data is stored in a memory within the computer.

19 Claims, 6 Drawing Sheets

APPARATUS AND METHOD OF ASSISTING VISUALLY IMPAIRED PERSONS TO GENERATE GRAPHICAL DATA IN A COMPUTER

BACKGROUND OF THE INVENTION

1. Field of the Invention

The present invention relates to techniques for assisting visually impaired persons to generate graphical data in a computer.

2. Description of the Related Art

It is known in the art that with appropriate assistant technology, persons who are blind or visually impaired are able to operate computers, access databases, read printed texts, and so on. By way of example, such technology includes speech synthesis, braille printers, braille displays, dot matrix displays, optical character recognition, etc. It is to be noted that throughout the instant disclosure, terms "blind" and "visual or vision impairment" are interchangeably used. It is to be noted that throughout this application, the term "graph" implies a drawing, figure, etc., including a flowchart, an arrangement for desk-top publishing, and so on.

Speech synthesis is to artificially generate spoken words through the application of computer-based hardware and software, making the computers accessible to persons with vision impairments. Braille printers and displays translate printed text into braille, respectively permitting blind users to obtain hardcopy from computers and to have access to computer screens. Dot matrix displays, which are similar to the braille printers, are usually assembled out of a large number of electromagnetically latching braille-dots. The dot is spring-supported in the "set"-position and held down in the reset position, allowing the users to get a picture of the presented data. On the other hand, optical character recognition systems read the printed word and speak it aloud or transmit the text into personal computers for storage and retrieval.

Thus, the visually impaired persons are able to enter text into computers, using the keyboards, with the aid of speech synthesis, and can get hardcopies of text in braille using the braille printers.

However, it is very advantageous if the persons with vision impairments are allowed to enter graphical data such as flow charts, layouts for desktop publishing, etc. into computers. However, until now no proposal has been made for assisting the blind persons to obtain graphical data in computers.

SUMMARY OF THE INVENTION

It is therefore an object of the present to provide an apparatus for visually impaired persons to generate graphical data in a digital computer.

Another object of the present invention is to provide a method of visually impaired persons to generate graphical data in a digital computer.

In brief, these objects are achieved by techniques wherein in order to assist a visually impaired person to generate digital image data in a computer, a plurality of graph components are provided each of which is tactually recognized by the visually impaired person. A touch graph is generated using the graph components on a plate-like member by the visually impaired person. The touch graph is acquired into a computer using an input interface such as digital still camera. Subsequently, a computer software analyzes the digital image data so as to define each of the graph components and logical relationship between the graph components. The analyzed digital image data is stored in a memory within the computer.

One aspect of the present invention resides in an apparatus for assisting visually impaired persons to generate graphical data in a computer, comprising: a plurality of graph components each of which is tactually recognized by a visually impaired person; a plate-like member on which the graph components are positioned to generate a touch graph; an input interface for acquiring digital image data of the touch graph into a computer; an image data analyzer for analyzing the digital image data so as to define each of the graph components and logical relationship between the graph components; and a memory for storing the analyzed digital image data.

Another aspect of the present invention resides in a method of assisting visually impaired persons to generate graphical data in a computer, comprising the steps of: (a) generating a touch graph using a plurality of graph components on a plate-like member, each of the graph components being tactually recognized by a visually impaired person; (b) acquiring digital image data of the touch graph into a computer; (c) analyzing the digital image data so as to define each of the graph components and logical relationship between the graph components; and (d) a memory for storing the analyzed digital image data.

BRIEF DESCRIPTION OF THE DRAWINGS

The features and advantages of the present invention will become more clearly appreciated from the following description taken in conjunction with the accompanying drawings in which like elements are denoted by like reference numerals and in which.

DETAILED DESCRIPTION OF THE PREFERRED EMBODIMENTS

One embodiment of the present invention will be described with reference to FIGS. 1–6.

Figure 1:
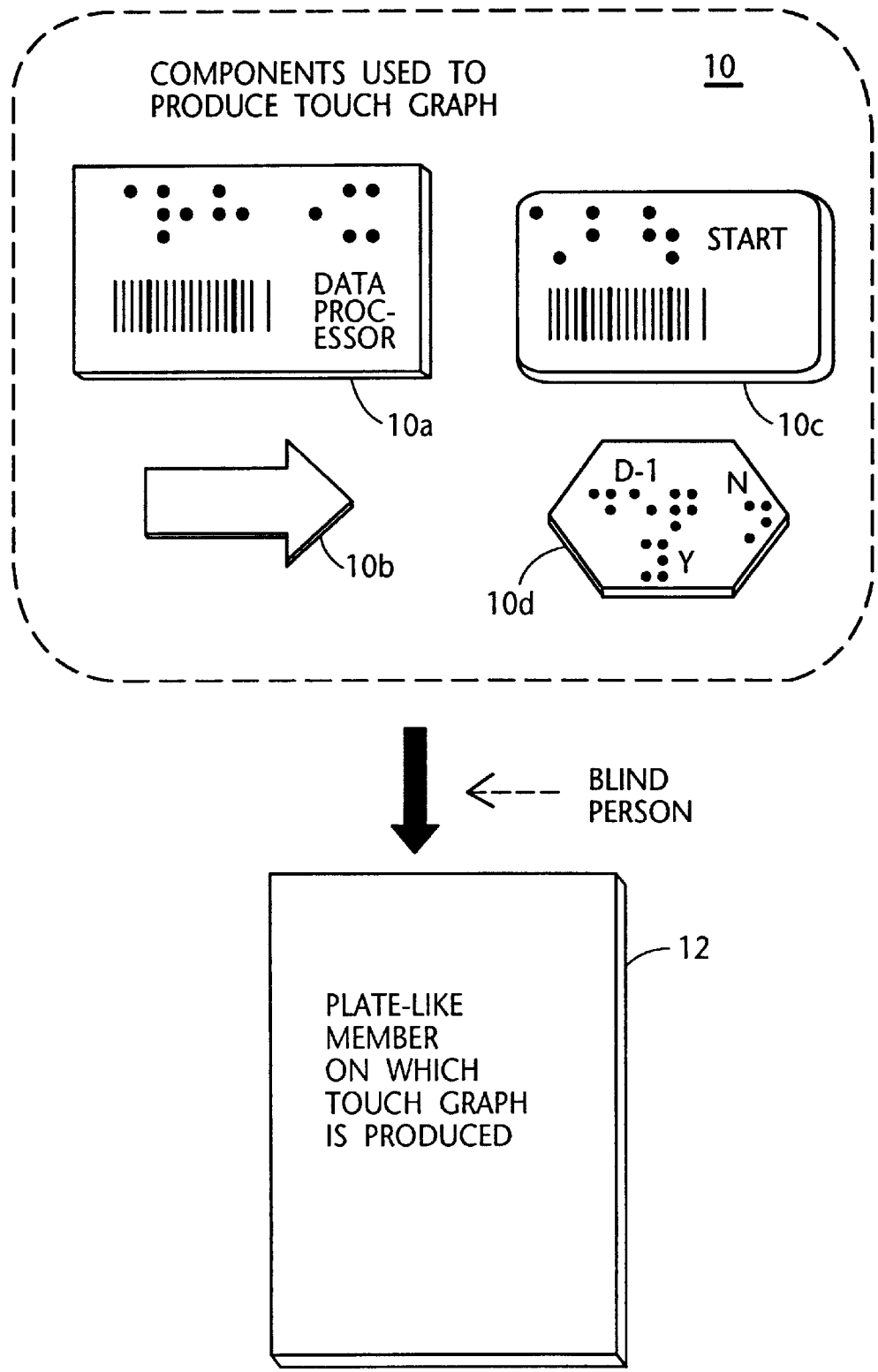
FIG. 1 is a diagram schematically showing a plurality of touch graph components and a plate-like member on which the touch graph is generated.

FIG. 1 is a block diagram schematically showing some examples of components (generally denoted by numeral 10) via which persons, who are blind or visually impaired, generate touch graphs on a plate-like member 12. It should be noted that the components 10 shown in FIG. 1 are exemplary and in fact take various shapes or forms in order to generate a variety of touch graphs for flow charts, desktop publishing, etc.

The components (viz., parts or elements) 10 of FIG. 1 are only four in number and utilized to generate flow charts in this particular case. More specifically, the components 10a–10d are respectively used to represent a data processing box, a flow direction line, a flow start indicating box, and a decision box. Each component should be constructed such as to be recognized by both blind and sighted persons, and sensed by computers. To this end, each of the components 10a and, 10c and 10d carries thereon braille letters (and numerals), a bar coded label, alphabets, etc. Further, although not clear from FIG. 1, it is preferable to provide identical and/or similar shaped components with different tactile surfaces (for blind persons) and different colors (for sighted persons and computers).

Figure 2:
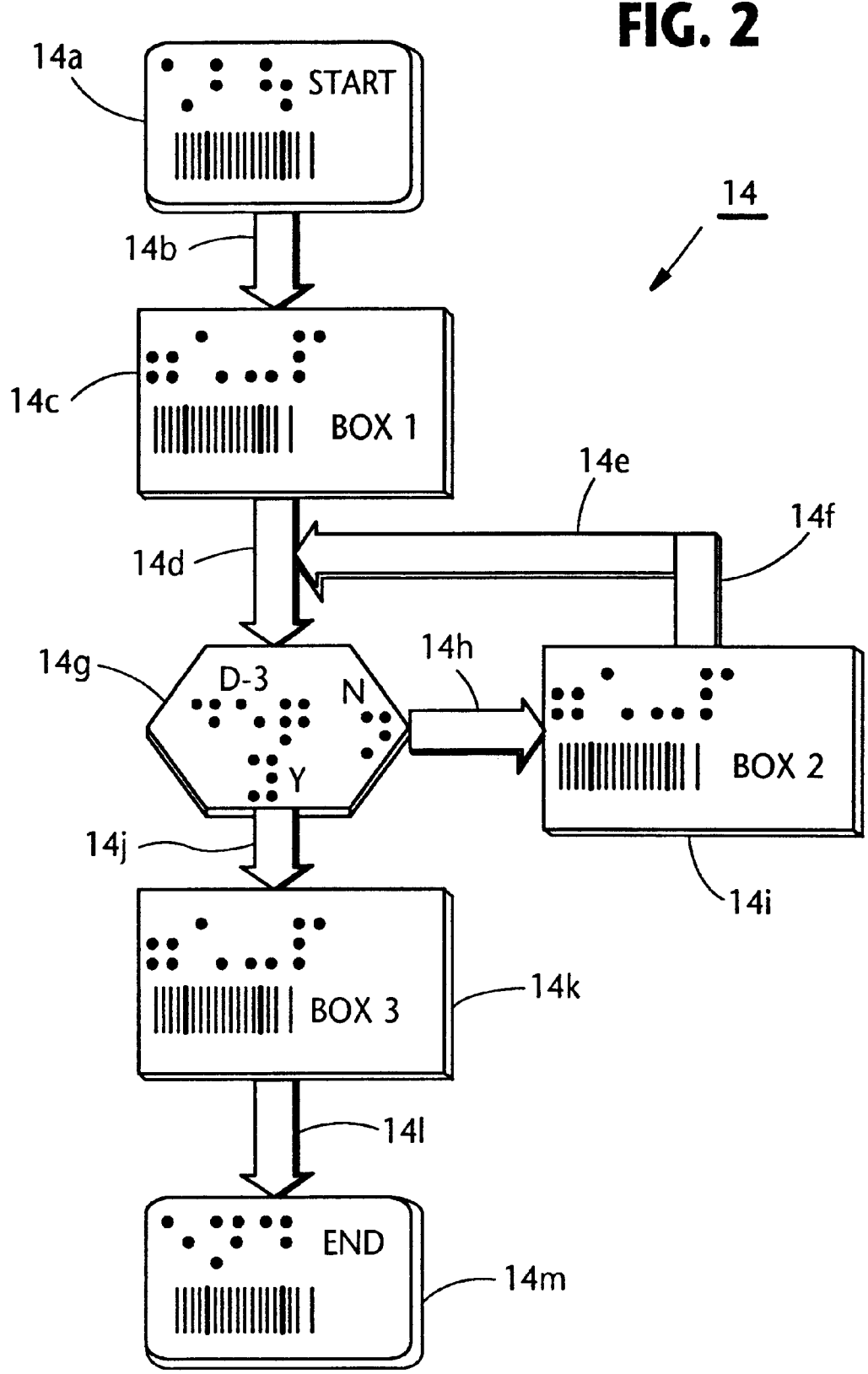
FIG. 2 is a diagram showing a touch graph that takes the form of flow chart in this particular case.

FIG. 2 shows one example of a touch graph (generally depicted by numeral 14), which takes the form of a flow chart and which is produced or arranged on the plate-like member 12 by a blind person. The touch graph 14 includes, in this particular case, thirteen components 14a–14m. It is to be noted that the present invention is not directly concerned with the contents of touch graphs.

Each of the touch graph components is fabricated such as to be detachably provided or located on the plate-like member 12 using magnets, pile-and-hook type clothes, etc.

Figure 3:
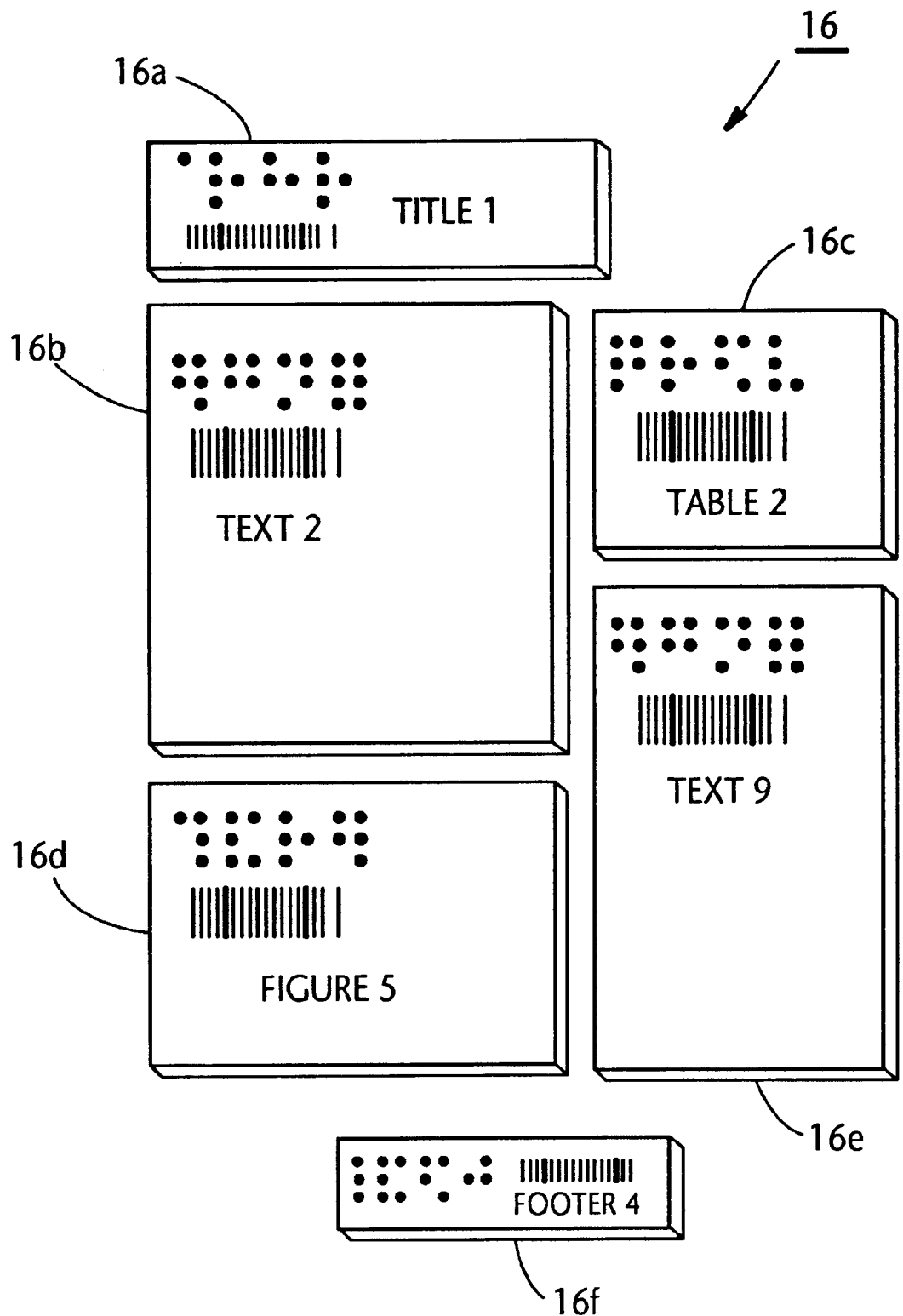
FIG. 3 is a diagram showing another touch graph that is generated for desktop publishing.

FIG. 3 shows another example of a touch graph (denoted by numeral 16) which takes the form of a layout for desktop publishing. That is, the touch graph 16 includes six graph components 16a–16f each of which carries thereon braille letters, a bar coded label, and alphabets plus numeral.

Figure 4:
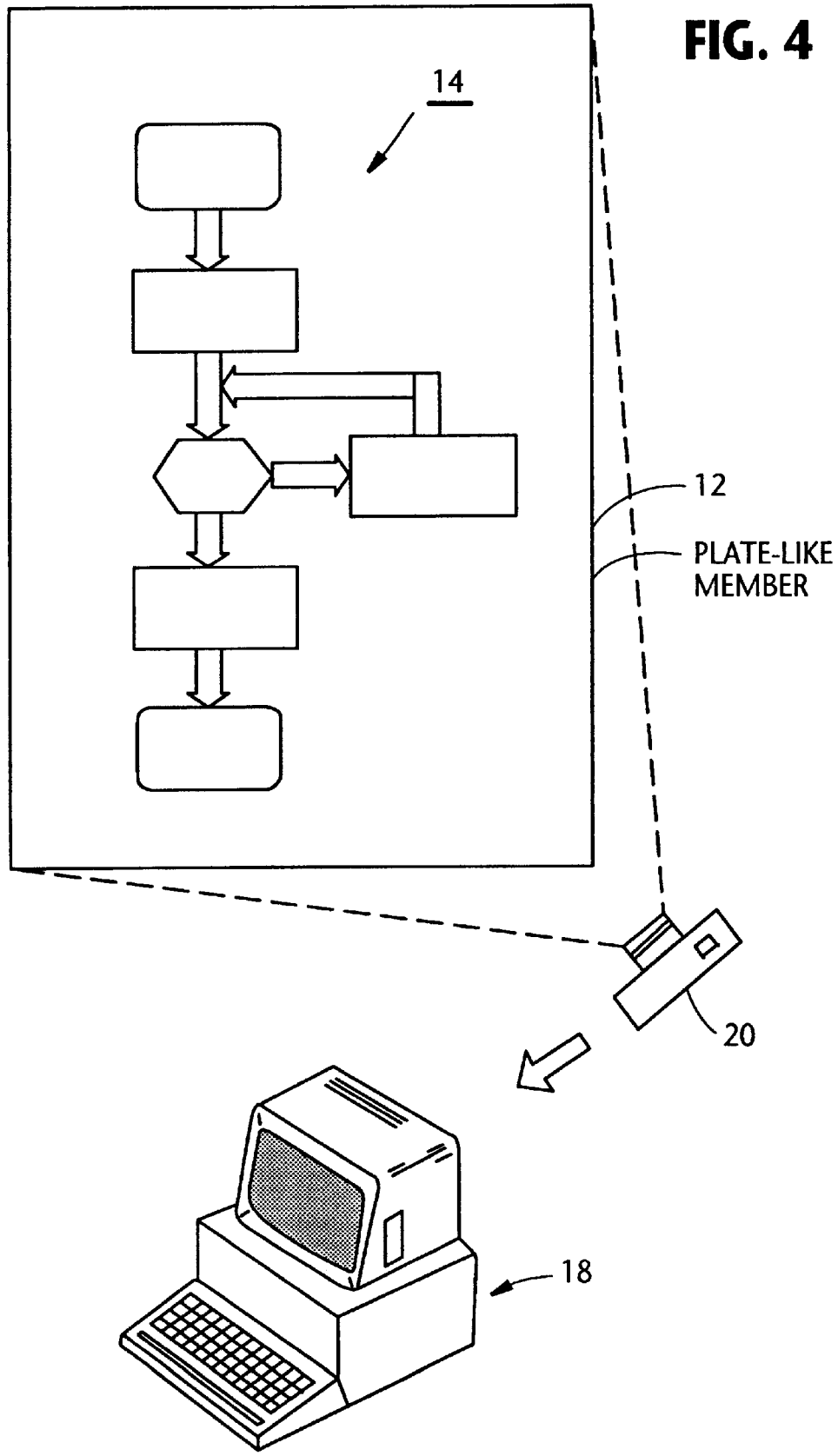
FIG. 4 is a diagram schematically showing a manner of acquiring the touch graph of FIG. 2 into a computer through a suitable input interface.

FIG. 4 is a sketch for illustrating a manner wherein the touch graph 14, generated on the plate-like member 12, is acquired into a computer 18 using a suitable input interface such as a CCD (charge-coupled device) type still camera 20.

Figure 5:
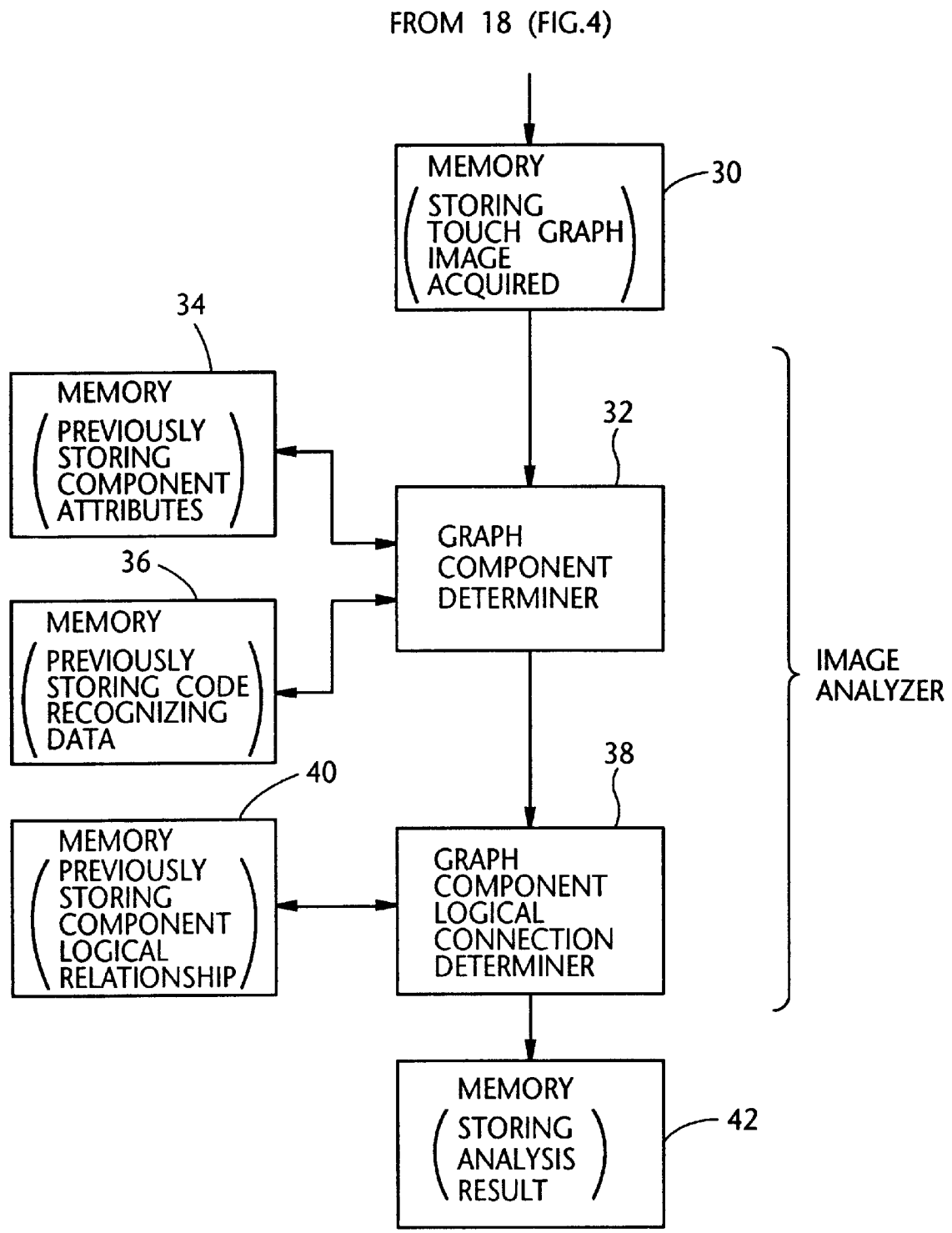
FIG. 5 is a diagram schematically showing a plurality of function blocks for use in generating digital image data representing a touch graph.

FIG. 5 is a diagram schematically showing computer's function blocks for receiving and processing the touch graph's digital image. As shown, the touch graph image, which has been acquired at the camera 20, is stored in a memory 30.

A graph component determiner 32 retrieves the image data from the memory 30 and specifies the components by accessing to two memories 34 and 36 under the control of a central processing unit (not shown). That is, the memory 34 previously stores components attributes, while the memory 36 previously stores code recognizing data. In brief, the determiner 32 defines each component and its location within the touch graph. These image analyzing techniques are well known in the art and thus, the details thereof will be omitted for the sake of simplifying the instant disclosure. Thereafter, a graph component logical connection is specified at a determiner 38 by referring to a memory 40 which previously stores the component logical relationship. Finally, the analyzed image data is stored in a memory 42.

Figure 6:
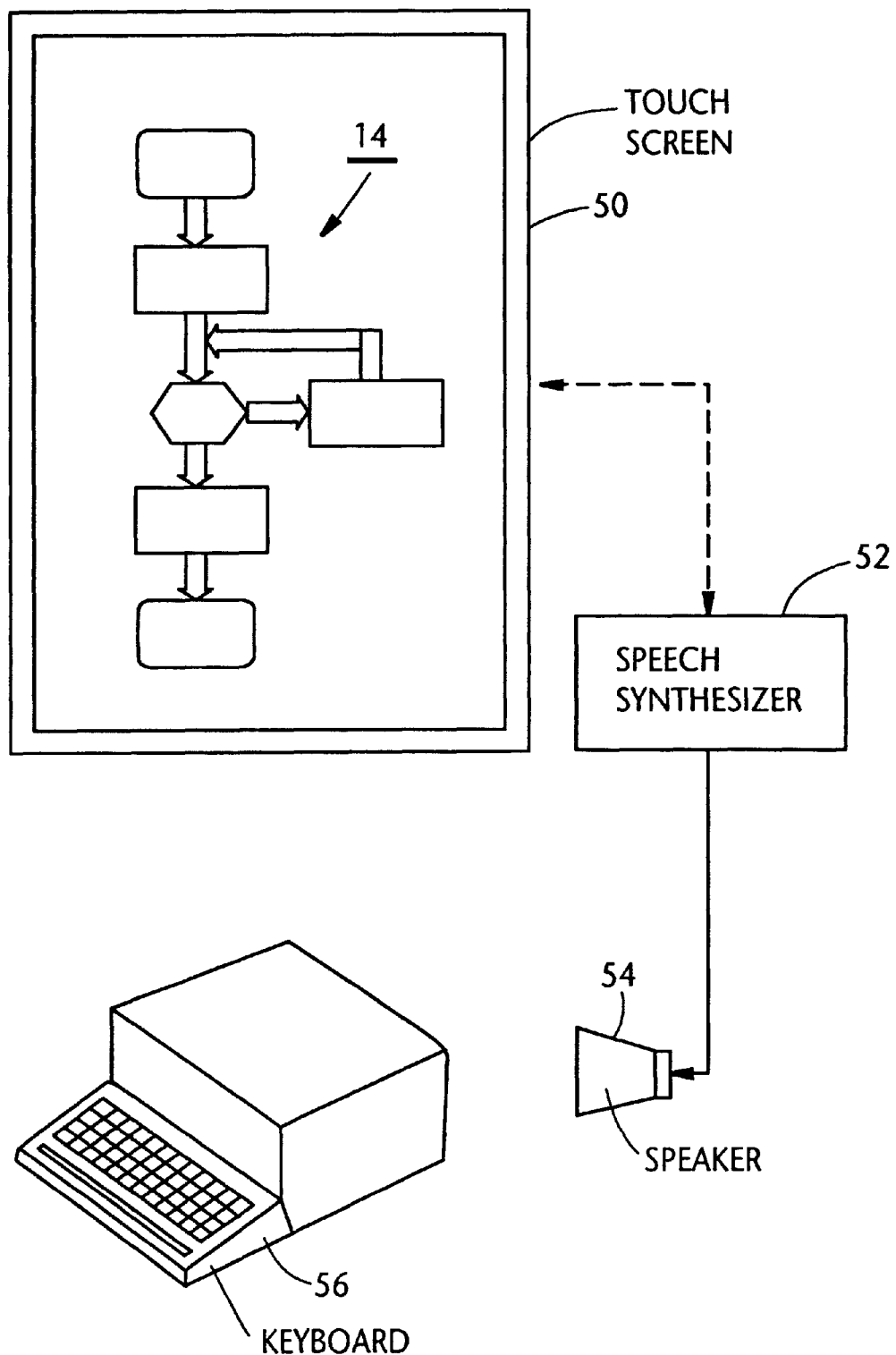
FIG. 6 is a sketch illustrating interactive operations for adding information in connection with a given graph component.

FIG. 6 is a sketch for illustrating an interactive operation for selecting a given graph component and adding information thereto by way of interactive operations. That is, the touch graph 14 (for example) is displayed on a touch screen 50. A blind person points to the screen 50 in order to select one component to which the person wants to add information (or edit the contents). The component selection is implemented using a suitable interactive device which includes a speech synthesizer 52 and a speaker 54 by way of example. When the blind person selects one component, he or she is able to add data thereto using a keyboard 56 with the aid of speech synthesis.

It will be understood that the above disclosure is representative of only one possible embodiment of the present invention and that the concept on which the invention is based is not specifically limited thereto.

What is claimed is:

1. An apparatus for assisting visually impaired persons to generate graphical data in a computer, comprising:
   a plurality of graph components each of which is tactually recognized by a visually impaired person;
   a plate-like member on which the graph components are positioned to generate a touch graph;
   an input interface for acquiring digital image data of said touch graph into a computer;
   an image data analyzer for analyzing said digital image data so as to define each of said graph components and a logical relationship between said graph components; and
   a memory for storing the analyzed digital image data.

2. An apparatus as claimed in claim 1, wherein each of said plurality of graph components is detachably secured on said plate-like member.

3. An apparatus as claimed in claim 1, wherein each of said plurality of graph components can be identified by sighted persons.

4. An apparatus as claimed in claim 1, wherein said plate-like member carries an identifier for ascertaining the identity thereof, said identifier being able to be recognized by visually impaired persons, sighted persons, and computers.

5. An apparatus as claimed in claim 3, further comprising:
   another input interface for acquiring said identifier carried on said plate-like member into said computer, said identifier being stored in said computer in relation to the analyzed digital image data.

6. An apparatus as claimed in claim 1, further comprising:
   a touch screen on which an image of the touch graph is displayed;
   an interactive device operatively coupled to said touch screen, said interactive device assisting communication between the visually impaired person and the computer so as to specify the graph components,
   wherein the visually impaired person is able to add information in connection with a given graph component by way of the touch screen and the interactive device.

7. An apparatus as claimed in claim 3, wherein the identifying by said sighted persons is based on a unique shape of each of the graph components and not based on knowledge of Braille.

8. An apparatus as claimed in claim 7, wherein one unique shape corresponds to a rectangular shape, another unique shape corresponds to hexagonal shape, and yet another unique shape corresponds to a line with an arrow at one end thereof.

9. An apparatus as claimed in claim 2, wherein each of said plurality of graph components is detachably secured to said plate-like member by way of a magnet.

10. An apparatus as claimed in claim 6, wherein, when the visually impaired person touches the screen at a location corresponding to one of the graph components of said touch graph that are visually displayed on said touch screen, the interactive display provides an audible output as to which the one of the graph components the location corresponds to, and wherein the interactive display includes a keyboard by which the visually impaired person can add information to the one of the graph components.

11. A method of assisting visually impaired persons to generate graphical data in a computer, comprising the steps of:
   (a) generating a touch graph using a plurality of graph components on a plate-like member, each of the graph components being tactually recognized by a visually impaired person;

(b) acquiring digital image data of the touch graph into a computer;

(c) analyzing said digital image data so as to define each of said graph components and a logical relationship between said graph components; and (d) a memory for storing the analyzed digital image data.

12. A method as claimed in claim 11, wherein each of said plurality of graph components is detachably secured on said plate-like member.

13. A method as claimed in claim 11, wherein each of said plurality of graph components can be identified by sighted persons.

14. A method as claimed in claim 11, further comprising:

acquiring an identifier carried on said plate-like member for ascertaining the identity thereof; and storing said identifier in said computer in relation to the analyzed digital image data.

15. A method as claimed in claim 11, further comprising:

displaying an image of the touch graph on a touch screen;

specifying a given graph component using an interactive device operatively coupled to said touch screen, said interactive device assisting communication between the visually impaired person and the computer so as to specify the graph components; and allowing the visually impaired person to add information in connection with the given graph component by way of the touch screen and the interactive device.

16. A method as claimed in claim 13, wherein the identifying by said sighted persons is based on a unique shape of each of the graph components and not based on knowledge of Braille.

17. A method as claimed in claim 16, wherein one unique shape corresponds to a rectangular shape, another unique shape corresponds to hexagonal shape, and yet another unique shape corresponds to a line with an arrow at one end thereof.

18. A method as claimed in claim 12, wherein each of said plurality of graph components is detachably secured to said plate-like member by way of a magnet.

19. A method as claimed in claim 15, wherein, when the visually impaired person touches the touch screen at a location corresponding to one of the graph components of said touch graph that are visually displayed on said touch screen, the interactive display provides an audible output as to which the one of the graph components the location corresponds to, and wherein the interactive display includes a keyboard by which the visually impaired person can add information to the one of the graph components.

* * * * *